Figure 1A:
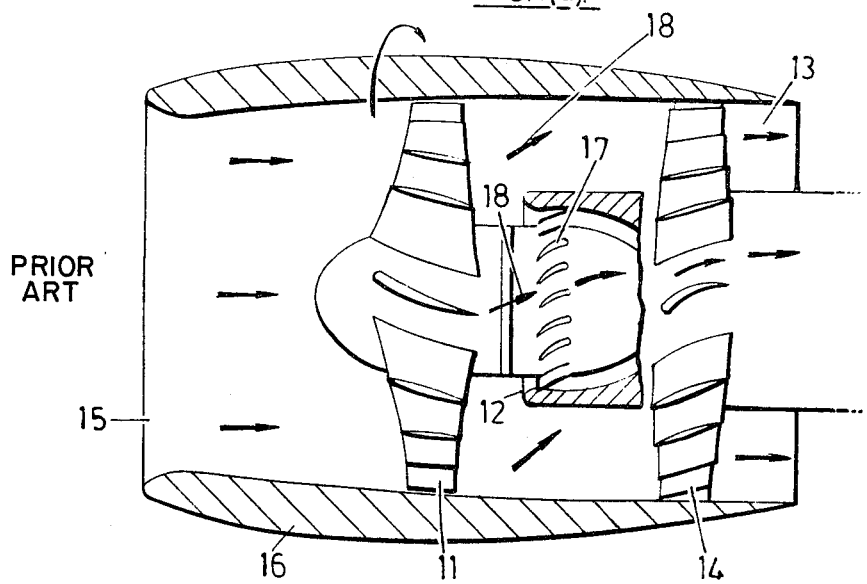

United States Patent [19]
Ketley

[11] 3,916,620
[45] Nov. 4, 1975

[54] PROPULSIVE DUCTED FANS
[75] Inventor: Gilroy Reginald Ketley, Hatfield, England
[73] Assignee: Hawker Siddeley Dynamics Limited, England
[22] Filed: May 16, 1974
[21] Appl. No.: 470,466

[52] U.S. Cl................. 60/226 A; 415/192; 415/216
[51] Int. Cl.² ......................... F02C 3/06; F02K 3/06
[58] Field of Search ........................... 415/191–194, 415/216, 217; 60/226 A, 226 R

[56] References Cited
UNITED STATES PATENTS
3,468,473  9/1969  Davies et al. ........................... 60/226
3,747,343  7/1973  Rosen .................................... 60/269

Primary Examiner—C. J. Husar
Assistant Examiner—Robert E. Garrett
Attorney, Agent, or Firm—Rose & Edell

[57] ABSTRACT

A gas turbine power plant has a reversible pitch ducted fan driven by a core engine, the core engine intake being downstream of the fan rotor, while the fan stator is in turn donwstream of the engine intake in a bypass passage surrounding the engine and intake. Within the engine intake there are inlet guide vanes; and flow-correcting blades forming extensions of the inlet guide vanes project forward and outward of the engine intake lip and extend back along the outside of the intake within the bypass passage to the fan stator, these flow-correcting blades being so angled as to reverse the swirl given by the fan stator to the forward flowing portion of air that eventually enters the engine intake when the fan is operating in reverse pitch.

3 Claims, 3 Drawing Figures

PROPULSIVE DUCTED FANS

This invention relates to gas turbine power plant in which a core engine drives a ducted fan, and is particularly concerned with improvements to the air flow of such engines where the pitch of the fan is made variable.

In such engines, especially where the design places the fan stator downstream of the core engine intake, a major difficulty is experienced in obtaining efficient admission of air to the core engine when the fan rotor is in reverse pitch, such as when using engine power to effect braking during landing of an aircraft. This is mainly brought about because in efficient forward flight of the aircraft the rotating fan blades ahead of the core engine are driven in forward pitch and this results in the fan imparting a clockwise swirl to the air flowing from the fan rotor towards the core engine intake and through the bypass around the core engine. It is thus necessary to reduce or remove the swirl for efficient operation of the engine and a solution to this problem is to fit a set of suitably angled inlet guide vanes to the engine and to use a fan stator with suitably angled blades.

However, when the fan rotor is put into reverse pitch the air now flows from the bypass exit through the fan stator towards the fan rotor and the inner annulus of this air strikes the inlet guide vanes of the engine at very negative incidence — almost broadside on. A distorted and turbulent flow results downstream of the inlet guide vanes which reduces the engine efficiency. As the fan pressure ratio is increased so that a higher swirl rate results, the problem is further magnified and a known solution is to move the fan stator forward of the core engine intake, the result of which is to increase the overall length, weight and expense of the engine.

By contrast, the invention seeks to overcome the problem without extending the length or significantly increasing the weight or expense of the engine.

According to the present invention, there is provided a gas turbine power plant comprising a ducted fan of which the rotor has reversible pitch blades and is driven by a core engine having its intake situated in the duct downstream of the fan rotor, and the fan stator is located downstream of the core engine intake in an annular bypass passage surrounding said engine and intake, and wherein inlet guide vanes are provided in the core engine intake, characterised by flow-correcting vanes or blades projecting out from the core engine intake lip which are angled such as to substantially reverse the swirl given by the fan stator to the portion of the initially forward-flowing air that enters the engine intake when the fan rotor is in reverse pitch, while presenting substantially zero incidence angle to the rearward air flow from the fan rotor when the fan is in forward pitch.

Figure 1B:
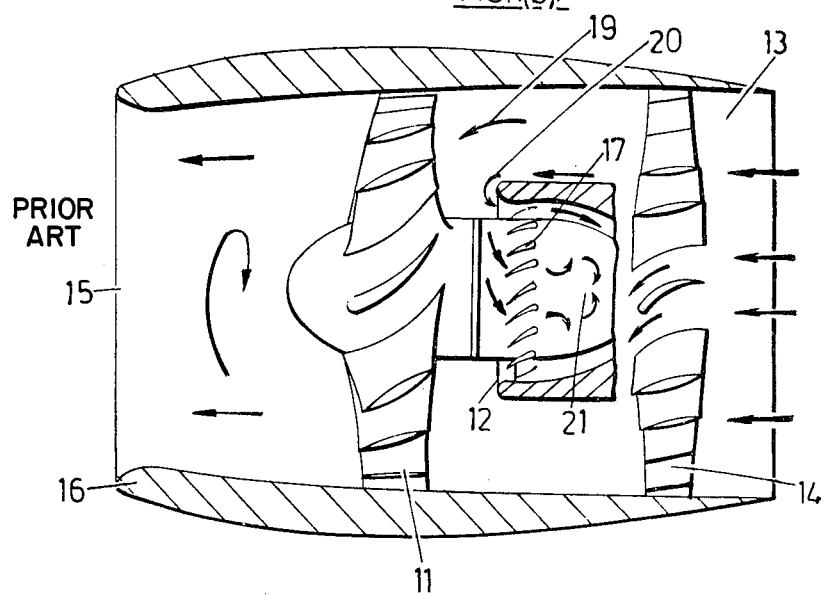
Figure 2:
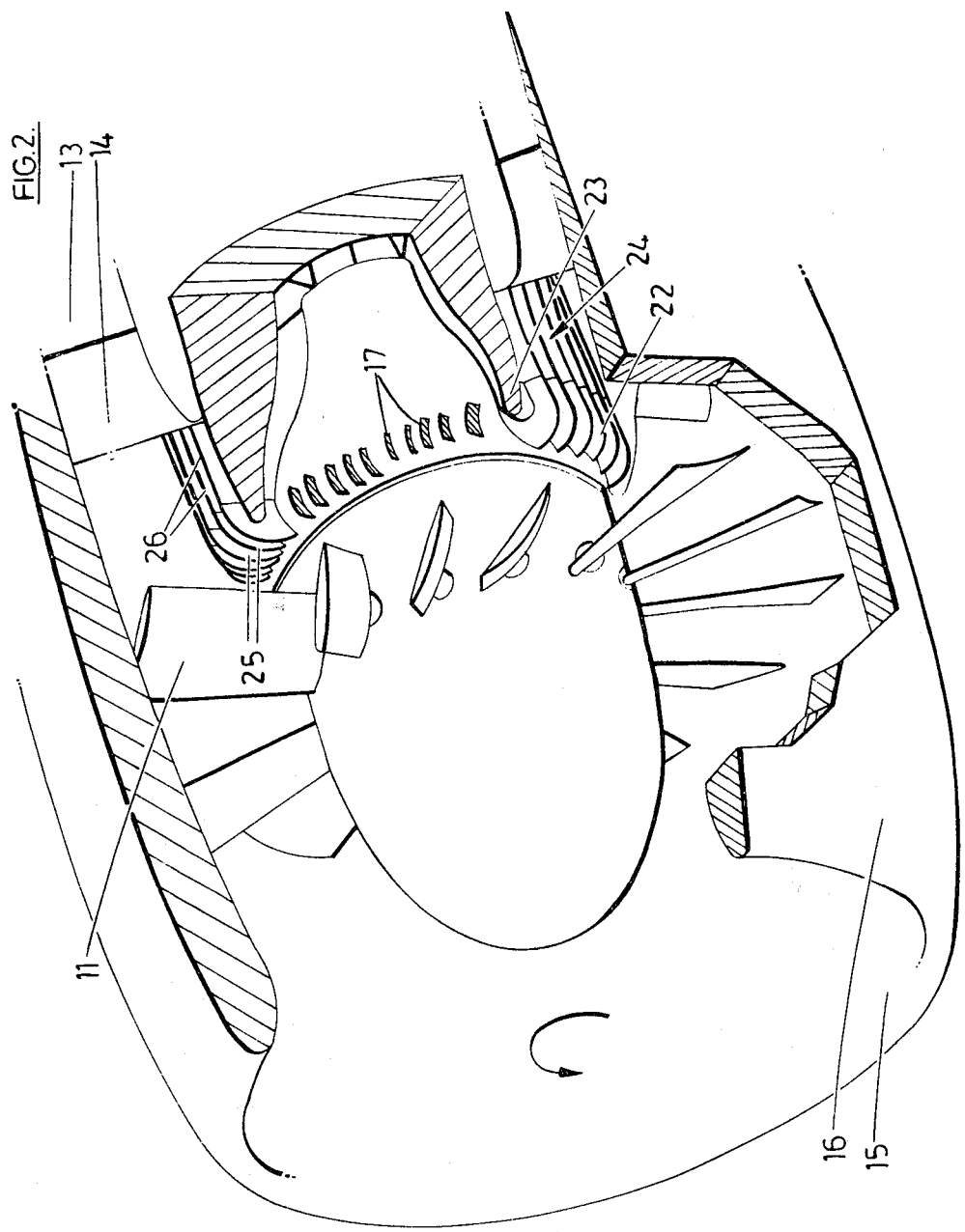

The invention will be better understood from the following description given with reference to the accompanying drawings, in which:

FIG. 1a shows in diagrammatic longitudinal section a known engine in normal operation, FIG. 1b illustrates the same engine with the fan rotor in reverse pitch, and FIG. 2 shows in pictorial part-sectional view an engine according to the invention.

Referring to FIG. 1a, the prior art gas turbine engine shown has a ducted fan rotor 11 upstream of the entry 12 to a core engine which drives the fan, the fan stator 14 being located downstream of the entry 12 in a bypass duct 13 surrounding the core engine. With the fan rotor blades in a forward pitch setting and driven clockwise, the air entering at the inlet 15 of the fan duct 16 is given a clockwise swirl as indicated by the arrows 18. To substantially remove this swirl the blades of the fan stator 14 are angled oppositely to the blades of the rotor 11; and also the entry 12 to the core engine is equipped with inlet guide vanes 17 likewise angled oppositely to the fan rotor blades.

If now the pitch of the blades of the fan rotor 11 is reversed, as in FIG. 1b, the air enters at the exit of the bypass duct 13 and passes forward through the fan stator 14 where it is given counterclockwise a swirl as indicated by the arrows 19. An inner annular portion of this air turns into the core engine entry 12, as indicated at 20, where it impinges on the inlet guide vanes 17 at a very bad angle and the result is that beyond the guide vanes 12, at 21, the air in the engine intake is in a thoroughly turbulent state and the engine cannot run efficiently.

The problem is overcome by the provision of a circumferential series of angled flow-correcting vanes or blades which are either attached to the core engine intake lip or form extensions of the inlet guide vanes and which extend forward and outward of the intake lip and possibly may extend back along the outside of the intake to the fan stator.

In the arrangement of FIG. 2, such flow-correcting vanes 22 form extensions of the inlet guide vanes 17 which project forward, around and outward of the intake lip 23 and are then shown extending back outside the intake and within the bypass duct 13, as at 24, to the fan stator 14. These vanes 22 are so angled as to present their leading edges 25 at zero incidence to the clockwise air swirl when the fan rotor 11 is in forward pitch, whereas when the fan rotor is in reverse pitch they provide continuous guiding passages 26 to receive the inner annular portion of the air passing through the fan stator 14 and reverse the unwanted counterclockwise swirl created by the stator 14 so that the flow entering the engine inlet guide vanes 17 has a clockwise swirl just as when the fan is running in forward pitch. The result is that the air reaching the inlet guide vanes 17 now has a clockwise swirl irrespective of whether the fan is in forward or reverse pitch, and the inlet guide fans 17 act to remove this clockwise swirl with the fan in reverse pitch in the same manner as they do in forward pitch.

What I claim is:

1. A gas turbine power plant; comprising a ducted fan having a rotor with reversible pitch blades, a core engine mounted centrally in the fan duct and coupled to drive the fan, an air intake for the core engine situated in the fan duct downstream of the fan rotor said air intake having an intake lip at its upstream end facing the fan rotor, an annular bypass passage surrounding said core engine and air intake, a fan stator located downstream of the core engine intake in said annular bypass passage which fan stator has stator blades angled oppositely to the blades of the fan rotor in forward pitch setting and curved from a leading edge at an angle tangential to the flow direction of the swirling air leaving the fan rotor to an axially directed trailing edge, inlet guide vanes provided in said core engine intake, and flow-correcting blades projecting out from the core engine intake lip which are angled such as to substantially reverse the swirl given by the fan stator to the portion of the initially forward-flowing air that enters the engine intake when the fan rotor is in reverse pitch, while presenting substantially zero incidence angle to the rearward air flow from the fan rotor when the fan is in forward pitch.

2. A power plant according to claim 1, wherein the flow-correcting blades are formed as extensions of said inlet guide vanes.

3. A power plant according to claim 1 or claim 2, wherein the flow-correcting blades extend forward of and outward around the core engine intake lip, and then extend back at the outside of the intake within the bypass passage substantially as far as the fan stator.

* * * * *